July 18, 1950 LA VERNE R. PHILPOTT 2,515,893

INTERMITTENT STOP MECHANISM FOR RECORDING PENCILS

Filed Dec. 8, 1944 11 Sheets-Sheet 1

INVENTOR
LA VERNE R. PHILPOTT
BY
Samuel Ostrolenk
ATTORNEY

July 18, 1950 LA VERNE R. PHILPOTT 2,515,893

INTERMITTENT STOP MECHANISM FOR RECORDING PENCILS

Filed Dec. 8, 1944 11 Sheets-Sheet 2

INVENTOR
LA VERNE R. PHILPOTT
BY Samuel Ostrolenk
ATTORNEY

July 18, 1950 LA VERNE R. PHILPOTT 2,515,893

INTERMITTENT STOP MECHANISM FOR RECORDING PENCILS

Filed Dec. 8, 1944 11 Sheets-Sheet 3

INVENTOR
LA VERNE R. PHILPOTT
BY
Samuel Ostrolenk
ATTORNEY

INTERMITTENT STOP MECHANISM FOR RECORDING PENCILS

Filed Dec. 8, 1944 11 Sheets-Sheet 4

INVENTOR.
LA VERNE R. PHILPOTT
BY
Samuel Ostrolenk
ATTORNEY

INVENTOR
LA VERNE R. PHILPOTT
BY
Samuel Ostrolenk
ATTORNEY

July 18, 1950 LA VERNE R. PHILPOTT 2,515,893
INTERMITTENT STOP MECHANISM FOR RECORDING PENCILS
Filed Dec. 8, 1944 11 Sheets-Sheet 6

INVENTOR
LA VERNE R. PHILPOTT
BY
Samuel Ostrolenk
ATTORNEY

July 18, 1950 LA VERNE R. PHILPOTT 2,515,893

INTERMITTENT STOP MECHANISM FOR RECORDING PENCILS

Filed Dec. 8, 1944 11 Sheets-Sheet 7

INVENTOR.
LA VERNE R. PHILPOTT

BY

ATTORNEY

INVENTOR
LA VERNE R. PHILPOTT
BY Samuel Ostrolenk
ATTORNEY

INVENTOR
LA VERNE R. PHILPOTT
BY
Samuel Ostrolenk
ATTORNEY

July 18, 1950 LA VERNE R. PHILPOTT 2,515,893

INTERMITTENT STOP MECHANISM FOR RECORDING PENCILS

Filed Dec. 8, 1944 11 Sheets-Sheet 10

INVENTOR
LA VERNE R. PHILPOTT
BY
Samuel Ostrolenk
ATTORNEY

INTERMITTENT STOP MECHANISM FOR RECORDING PENCILS

INVENTOR
LA VERNE R. PHILPOTT
BY Samuel Ostrolenk
ATTORNEY

Patented July 18, 1950 2,515,893

UNITED STATES PATENT OFFICE 2,515,893

INTERMITTENT STOP MECHANISM FOR RECORDING PENCILS

La Verne R. Philpott, Washington, D. C., assignor, by mesne assignments, to Pierce Company, Providence, R. I.

Application December 8, 1944, Serial No. 567,236

3 Claims. (Cl. 346—139)

My present invention relates to a facsimile receiver and more particularly to a facsimile receiver adapted to receive and reproduce transmitted images on ordinary unprepared paper.

More specifically, my invention relates to a facsimile receiver which will use as the scanning element a vibrating pencil member arranged and operated to make marks varying in shading in accordance with the shading or density of the elemental areas of the transmitted image.

Various methods have been used for recording facsimiles at a receiver. These methods have included recording elements which consisted of a variable intensity light beam cooperating with photo-sensitive paper; a stylus member cooperating with specially prepared thermally sensitive or electro-sensitive paper; printing units which included a pen for depositing ink in dots or lines varying in spacing or thickness in accordance with variations in the elemental areas of the transmitted image; and printing elements using bars or other vibrating members which press a marking member or marking element, such as carbon paper, against a recording sheet, spacing the marks thus produced in accordance with variations in the transmitted image.

Substantial variations in shading have been obtainable with photo recorders and even with the electro-sensitive or thermo-sensitive papers which utilize a stylus. The substantial difficulty that occurs, however, with photo recorders is that the photo-sensitive sheet must be handled under light-proof conditions and must be developed after the recording operation. These conditions are not compatible with high speed facsimile transmission or with simple continuous facsimile transmission; the photo-sensitive recorder, by reason of the many operations that must be performed with respect thereto, is not adapted for operation or use by any but highly trained technicians. Its commercial use is, therefore, limited to those instances only where such highly trained technicians are constantly available.

In the case of electro-sensitive or thermo-sensitive recording on prepared paper, continuous facsimile recording without undue handling and without any great skill on the part of the operator is possible. However, the recording sheet which is used must be specially prepared and treated, and many of the characteristics of this recording sheet are marginal.

Thus, in recording sheets for the stylus type of recording where a conductive black base paper is used having a white metallic coating which is discolored by the passage of electric current, minute variations in the density of the coating will cause corresponding variations in the recorded picture and even slight and unforeseeable defects in the evenness of the coating will tend to mar the picture. Since such coatings are usually very thin, and since the sheet in use is taken from a roll passed through various feed rolls and other elements and is subject to a great deal of handling and possible marring on its passage through the machine, such minor defects are likely to occur even in an initially perfect recording sheet. These minor defects, however, are capable of producing substantial and unforeseeable marring of the received image.

In the case of prior recorders of the printing type (inking pens and vibrating bars with carbon paper), variations in shading in the received image have not been possible. Whatever visual variations in shading occur are obtained by making wider or narrower lines, printing wider or narrower bars or spacing dots widely or closely to produce a species of half-tones.

A principal object of the invention is the provision of a scanning member for a facsimile recorder which will utilize an ordinary unprepared recording sheet and which will nevertheless produce marks varying in shade in accordance with the variations in shading of the elemental areas of the transmitted image. These marks will not simply be a series of blacks spaced by wider or narrower unmarked areas but will be substantially continuous marks varying from a very light grey to black.

Another object of my invention is the provision of a facsimile recorder utilizing a pencil member as the recording element, the said pencil member being so operative and arranged that it will produce marks of varying shades on the recording sheet of the recorder.

Another object of my invention is the provision of improved facsimile apparatus by means of which helical scanning can be accomplished with respect to a continuous recording sheet.

Previously, helical scanning was obtained by winding a recording sheet about a drum and causing the drum to rotate while the stylus or other recording element moved longitudinally of the drum. In another type of helical scanning, the stylus or other recording member rotated helically around the drum. In either of these types of recorders, helical scanning of a continuous sheet was impossible. In the so-called lawn mower type of recording, the recording element has a helical wire on a rotating drum, but the sheet moves longitudinally with respect to the drum, is not wound around the drum, and the recording operation is not a helical one; the helical wire is simply used in cooperation with a straight bar on the other side of the sheet to produce a series of transverse lines on the moving sheet.

True helical scanning, where the stylus or drum rotated to define a continuous helical line on the sheet, has heretofore been impossible with continuous sheet recording.

My present invention, by feeding the recording sheet around the inside of the drum and causing the marking member to rotate continuously within the drum, makes continuous sheet recording in connection with continuous helical scanning possible.

The foregoing, and many other objects of my invention, will become apparent in the following description and drawings in which.

Figure 1:
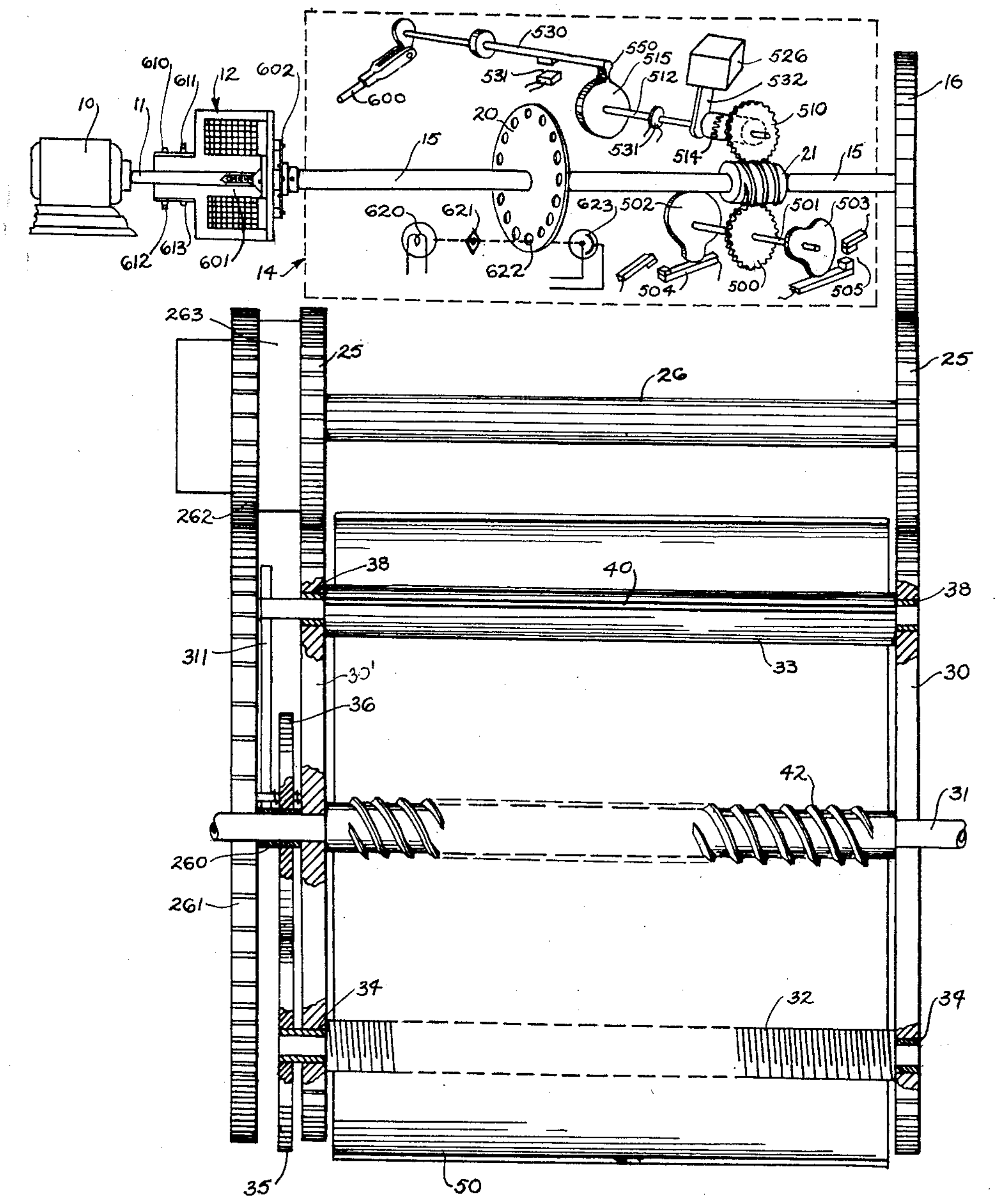
Figure 1 is a top plan view, partially broken away, showing schematically the drive elements of my novel facsimile recorder.
Figures 10, 13, 14:
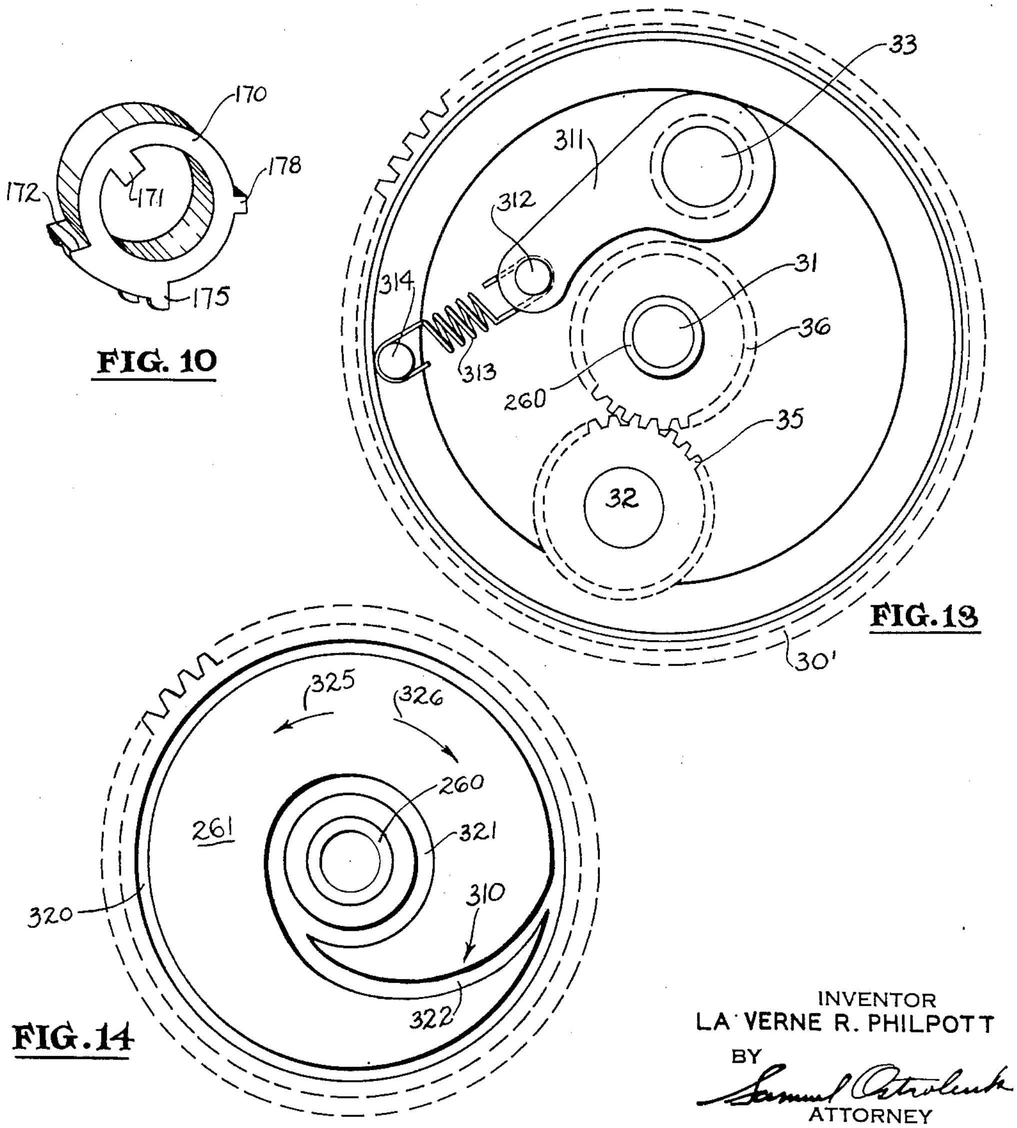
Figure 10 is a view in perspective of the cam shown in Figure 6.
Figure 13 is a view of the outer surface of the gear 30' of Figures 1 and 2 showing the elements mounted thereon.

Figure 14 is a view of the face of gear 261 of Figure 1 showing the spiral groove therein which cooperates with the element 312 of Figure 13, and the bushing 260 which carries the gear 36 of Figure 13.

Figure 15:
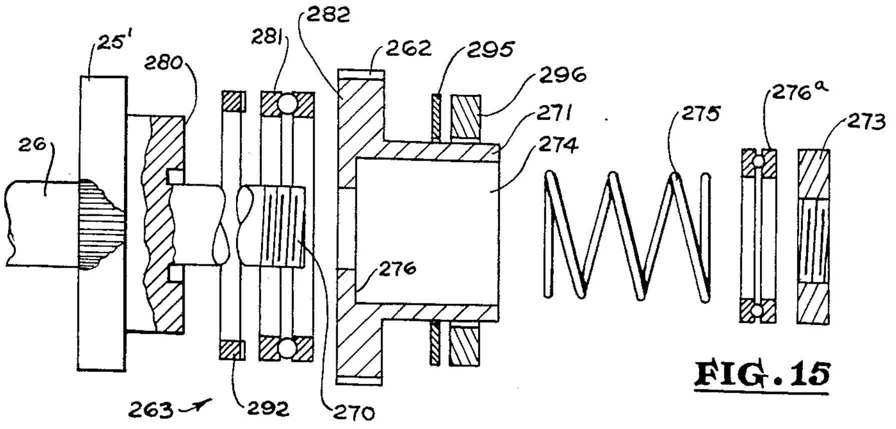

Figure 15 is an expanded view of the clutch 263 of Figure 1.

Figure 16:
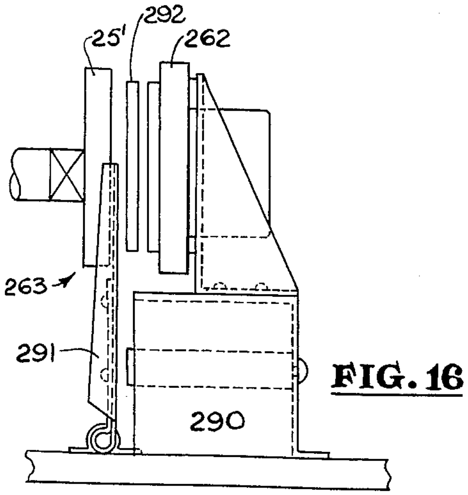

Figure 16 is a schematic view of the clutch of Figure 15.

Figure 17:
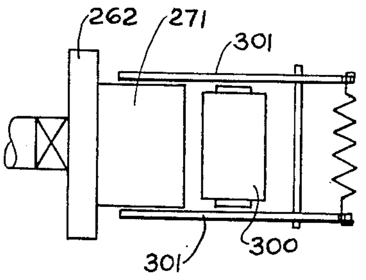

Figure 17 is a schematic view illustrating an additional modification of the clutch member to be used in connection with portions of the clutch of Figures 15 and 16.

Figure 18:
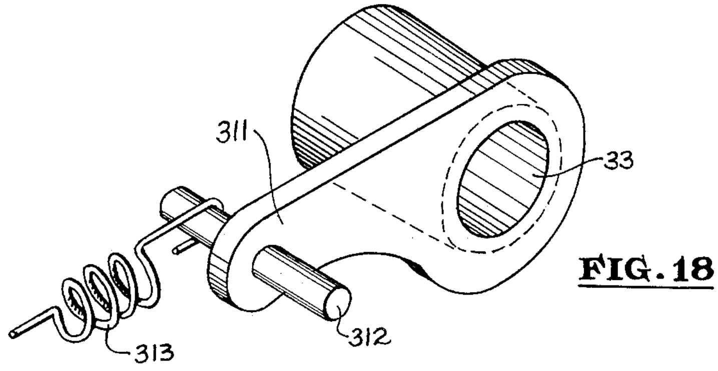

Figures 18 is a view in perspective of the element 311 of Figure 13.

Figure 19:
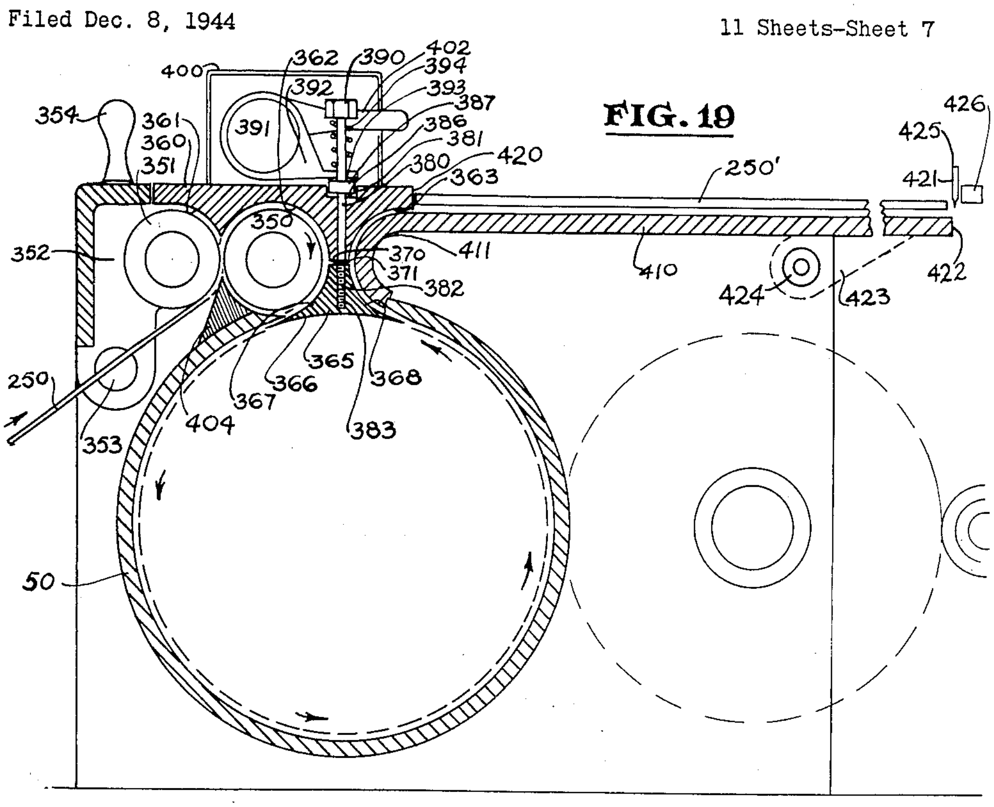

Figure 19 is a longitudinal section through my novel facsimile recorder showing the means for feeding and securing the paper in the recording drum. For purposes of clarity, the elements within the recording drum shown in Figure 6 have been omitted from this figure.

Figure 20:
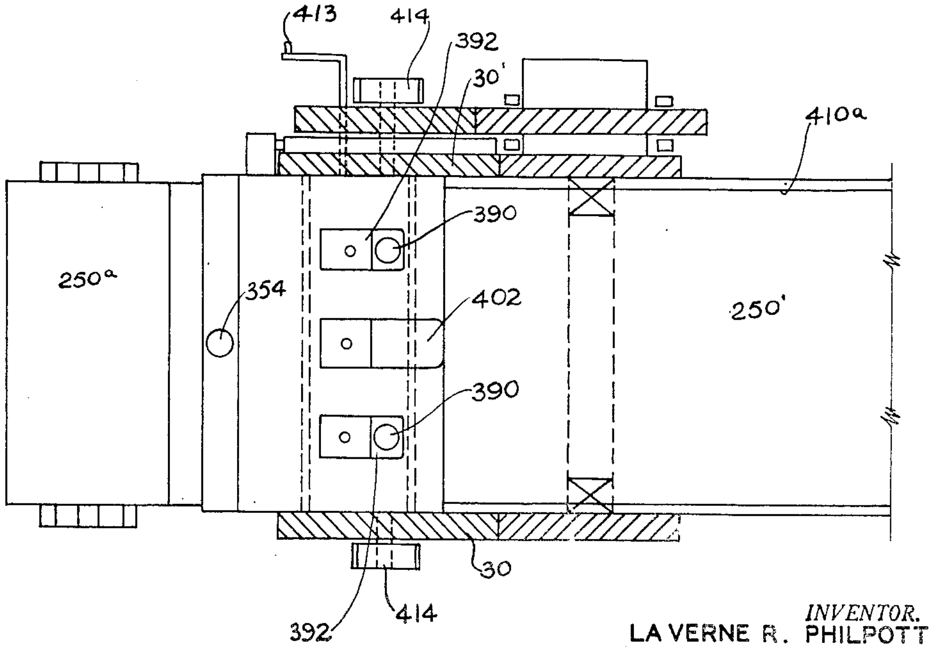

Figure 20 is a top view of my novel facsimile recorder.

Figures 21, 22, 23, 24:
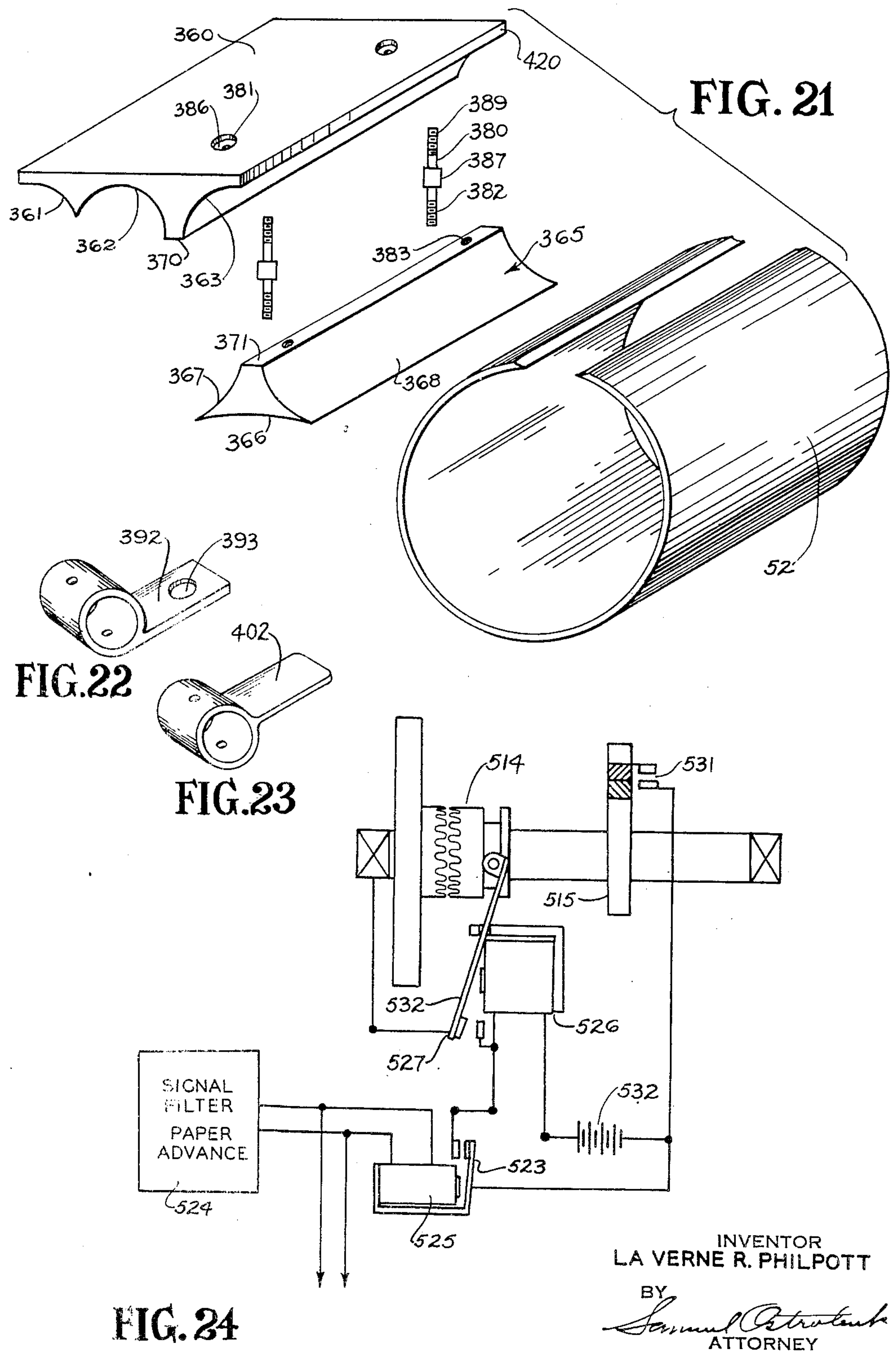

Figure 21 is an expanded view of the drum and paper clamping elements of Figures 19 and 20 showing the relationship therebetween.

Figure 22 is a view in perspective of the clamp operating element 392 of Figure 19.

Figure 23 is a view in perspective of the manual operating handle 402 for the clamp elements of Figures 19 and 21.

Figure 24 is a schematic view demonstrating the operation of the clutch 514 of Figure 1.

Figure 25:
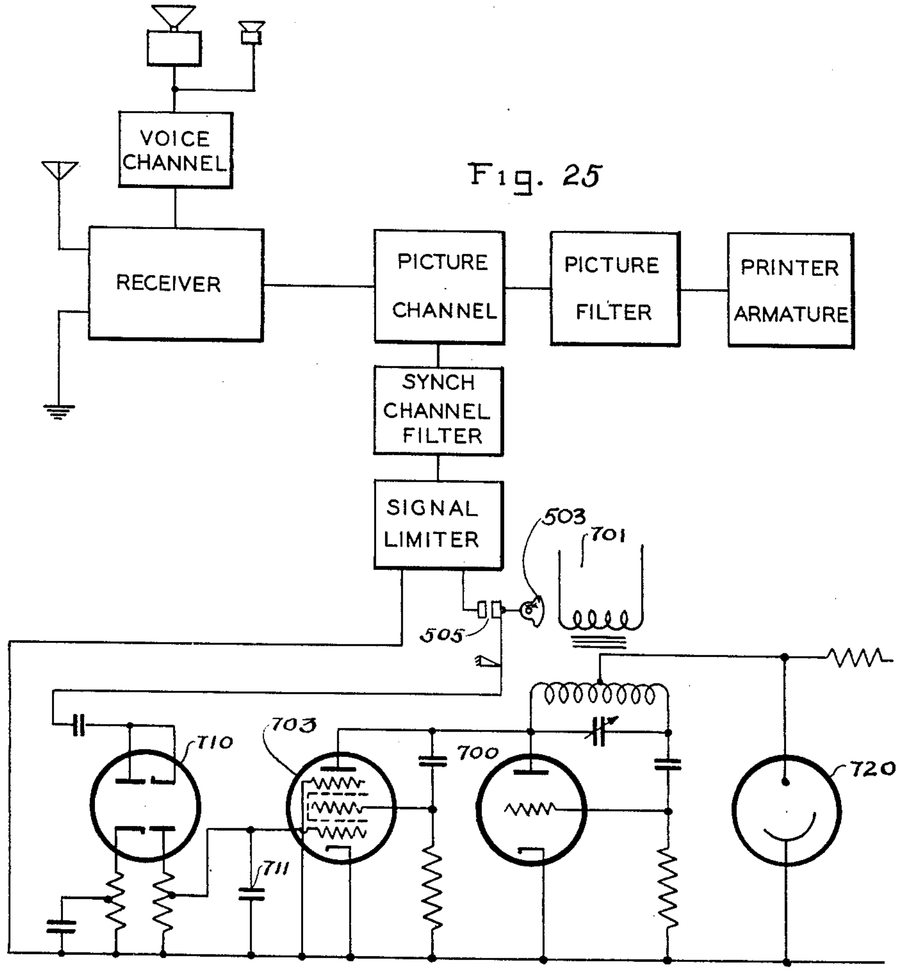

Figure 25 is a schematic view showing support elements for achieving appropriate synchronism between the recorder and the received impulses.

Figure 26:
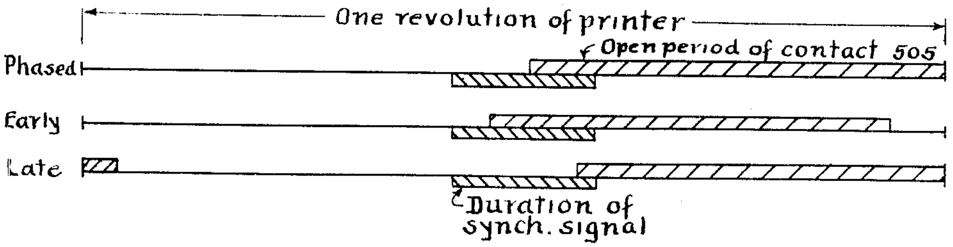

Figure 26 is a diagram showing the relationship between the synchronizing signal and the elements of the recorder.

Figure 27:
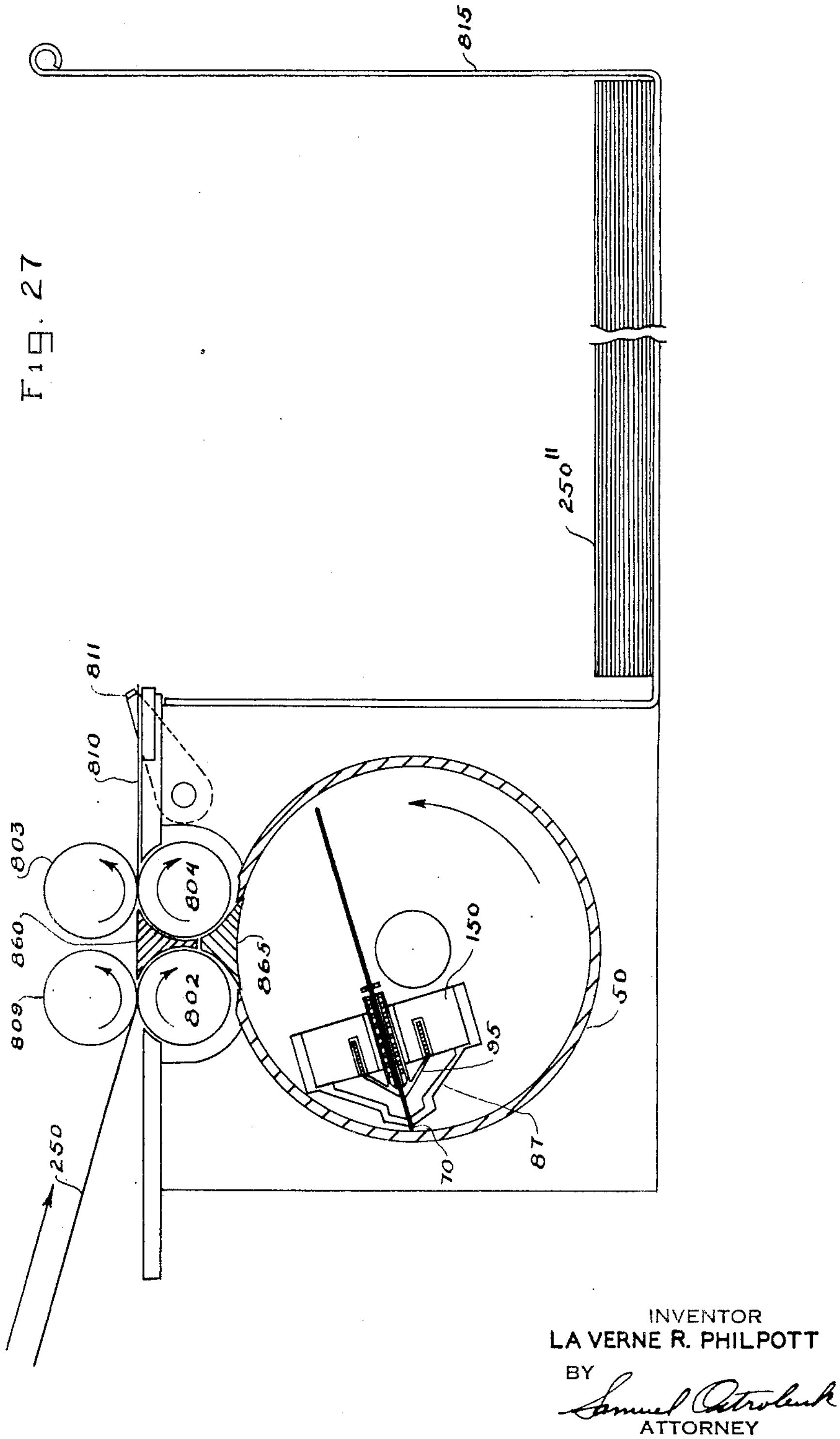

Figure 27 is a longitudinal section through my novel facsimile recorder showing the relationship of the various elements and showing a slightly modified paper feed.

Figure 28:
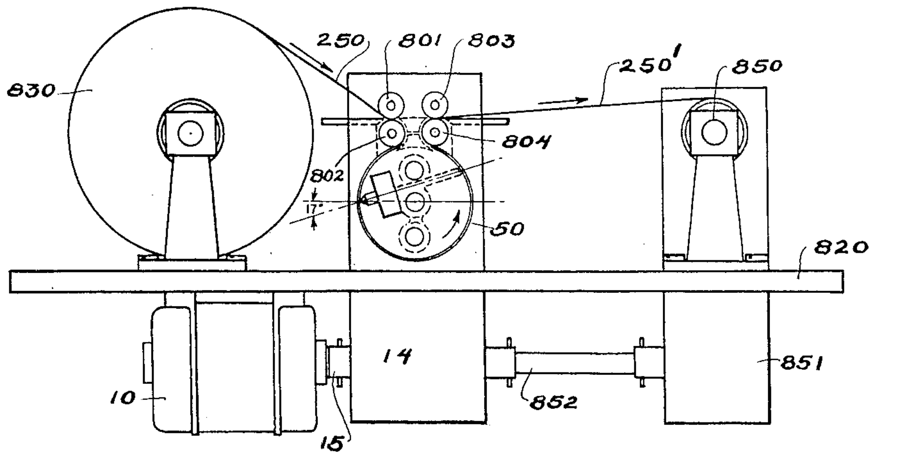

Figure 28 is a side view of my novel recorder showing the paper feed of Figure 27 and a slightly modified means for taking up the recorded picture.

Figure 29:
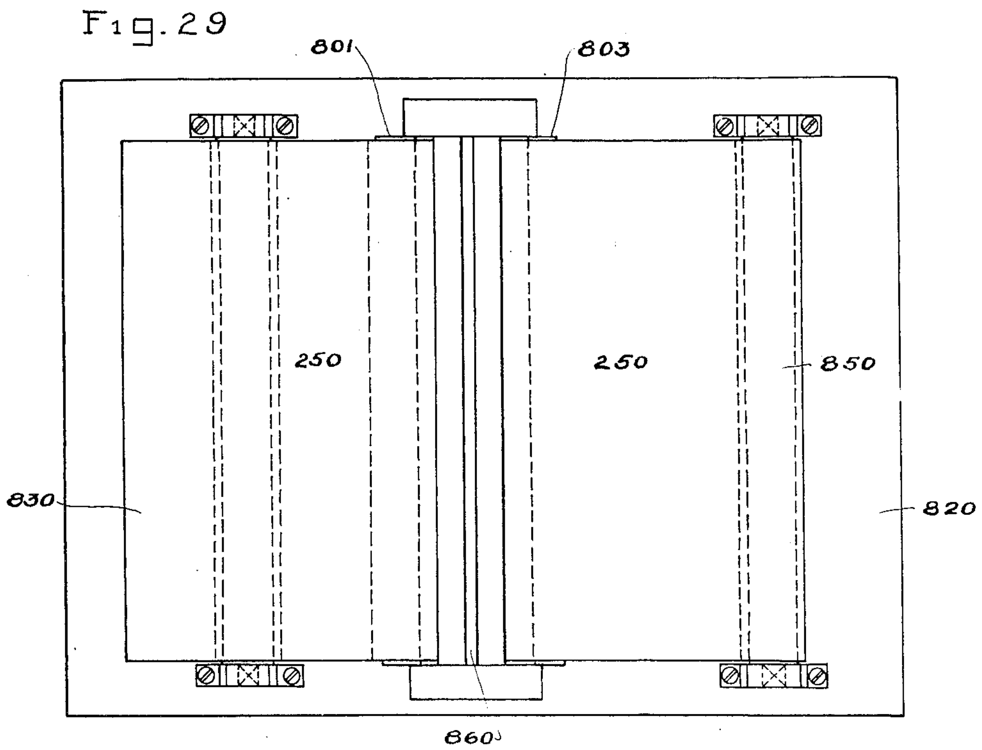

Figure 29 is a top view of the device of Figure 28.

Referring now to Figure 1, which shows a schematic lay-out of my facsimile apparatus, the motor 10 drives the shaft 11, which through the clutch 12 drives shaft 15. Shaft 15 drives the principal driving gear 16. Other elements (hereinafter described) necessary for operating the receiver mechanism are also driven from shaft 15 and are contained in the housing 14.

Gear 16 drives the idler gear 25 which is mounted on the tie-shaft 26. Idler gear 25 drives the main drive gear 30 which is rotatable around the stationary shaft 31.

In order appropriately to balance and rigidify the mechanism, the tie-shaft 26 carries a gear 25' at its opposite end, which gear duplicates the original gear 25. Gears 25 and 25' are keyed to the shaft 26 so that rotation of gear 25 results in corresponding rotation of gear 25'.

Similarly, the main drive gear 30 is duplicated by the opposite main drive gear 30' also rotatably mounted around the normally stationary shaft 31. Gears 30 and 30' are integrated for simultaneous rotation by the threaded shaft 32 and the slotted shaft 33. Threaded shaft 32 is rotatably mounted in the bearings 34, 34 in the opposite gears 30 and 30' and thus may readily rotate with respect to the gears 30 and 30' on which it is mounted.

The shaft 32 carries a small gear 35 keyed thereto. The small gear 35 meshes with the gear 36 of equal diameter keyed to the bushing 260 of gear 261. Gear 261 rotates at a different speed than gears 30 and 30' (as hereinafter described) so that the rotation of gear 36 is at a different speed than the planetary movement of gear 35. Thus, as the large gears 30 and 30' are rotated by the gears 25 and 25' around the stationary shaft 31, the threaded shaft 32, which rotates with its gear 35 in planetary manner about the shaft 31 and gear 36, is caused to rotate. The slotted shaft 33 is also rotatably mounted in bearings 38, 38 in the opposite large gears 30 and 30'.

The slot or groove 40 in the slotted shaft 33 is provided for resetting the pencil recorder in the manner hereinafter pointed out. Ordinarily, the slotted shaft 33 does not rotate in its bearings 38 in the large gears 30 and 30'. It is rotatably mounted, however, so that it may be angularly moved for the recorder resetting purposes hereinafter described.

The normally stationary shaft 31 is provided with a helical thread 42 along substantially its entire length between the gears 30 and 30', in order to rotate the recorder pencil carriage in the manner hereinafter described.

Other elements of the device shown in connection with Figure 1 will be more readily explained in connection with subsequent figures. In Figure 1 (however) I have omitted the pencil carriage and mount in order that the drive mechanism itself may more readily be seen, and I have compressed the structure laterally for clarity.

Figure 2:
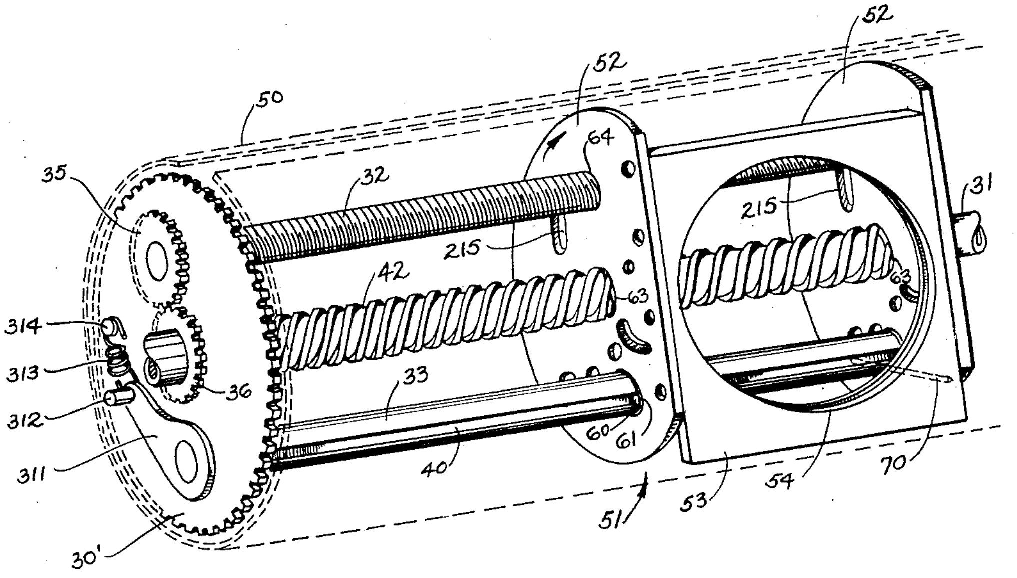
Figure 2 is a fragmentary view in perspective of the means for driving the record marking member of my novel facsimile recorder.

In Figure 2, I have shown in a schematic perspective view the mounting of the pencil carriage and mount on the shafts 32 and 33. The gear 30', shown in Figure 2, is duplicated on its opposite side by the gear 30 (not shown in Figure 2). The threaded shaft 32 is carried between the opposite gears 30 and 30' as already described in Figure 1. Similarly, the slotted shaft 33 with the groove or slot 40 is carried between the opposite gears 30 and 30', and the shaft 31 having the helical thread 42 extends between these opposite gears.

All of the elements can now in Figure 2 be seen more readily in their relation to the hollow recording drum 50 and the recording pencil carriage 51 (the hollow recording drum 50 is also indicated in Figure 1, but the recording pencil carriage is not shown in Figure 1). It is understood, however, that the recording pencil carriage is always mounted on the device. In Figure 2, the elements carried by the recording pencil carriage are not shown in order that the manner in which the recording pencil carriage is carried by the shafts may more readily be understood.

The recording pencil carriage comprises a pair of opposite parallel plates 52, 52 between which is carried the pencil motor plate 53. The pencil motor plate 53 is provided with an appropriately recessed race-way 54 for ball bearings, hereinafter more specifically described in connection with the specific description of the operation of the recording pencil.

Figure 3:
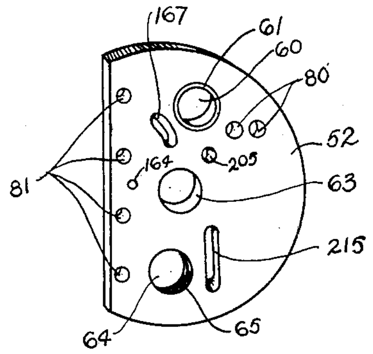
Figure 3 is a perspective view of one of the plates 52 of Figure 2 showing the relationship of the parts thereof.

Each of the plates 52, 52 has the form shown in Figure 3. The opening 60 through which the shaft 33 passes is provided with an insulated bushing 61 so that there will be no electrically conductive relation between the shaft 33 and the plate 52 for purposes hereinafter described.

The opening 63 at substantially the center of each of the plates is provided to permit the shaft 31 with its helical thread 42 to pass through the plates and through the carriage 51.

Each of the openings 64, in each of the plates 62 is threaded, as at 65 (Figure 3), in order that the plates 52 may be in threaded engagement with the threaded shaft 32 (Figure 2). Thus, the carriage 51, as will be seen from a comparison of Figures 2 and 3, is slidable along the shafts 31 and 33 but is in threaded engagement with the shaft 32.

The carriage 51 is held rigid with respect to the gears 30 and 30' so that it will not rotate with respect thereto by reason of the fact that shafts 32 and 33, which are secured to the said gears, pass through opposite sides of the carriage. Consequently, as the gears 30 and 30' rotate, the carriage 51 will rotate. But, since the threaded shaft 32 rotates on its own axis, owing to the engagement of its gear 35 with gear 36, the threaded shaft 32 will cause the carriage 51 to move longitudinally from one side of the apparatus (adjacent gear 30') to the other side of the apparatus (adjacent gear 30). This will result in appropriate scanning operation with respect to the hollow drum 50.

The scanning pencil has been indicated schematically in dotted lines at 70 of Figure 2, and the scanning drum 50 has also been indicated schematically in phantom in Figure 2. It will thus be seen that as the carriage 51 is rotated and moved longitudinally by the revolution of the gears 30, 30' and simultaneous revolution of the shaft 32, a helical scanning line will be traced on the interior of the hollow drum 50 or on any paper sheet extended over the interior of the said hollow drum 50.

Figure 4:
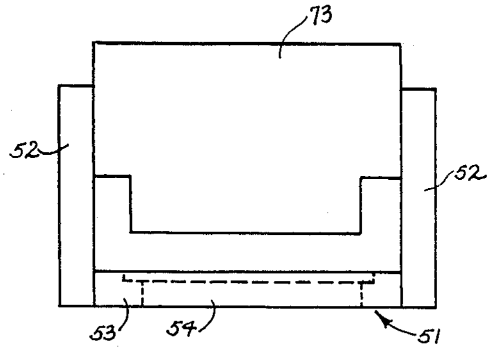
Figure 4 is a top view of the carriage member 51 of Figure 2 showing the relationship of the various supporting plates of the said carriage member.

In Figure 4, I have shown a top plan view of the pencil carriage 51 showing the organization and relationship of the side plates 52, 52 with the front pencil motor carrying plate 53 and its ball bearing race-way 54, and with the apparatus supporting platform 73 hereinafter more specifically described.

Figure 5:
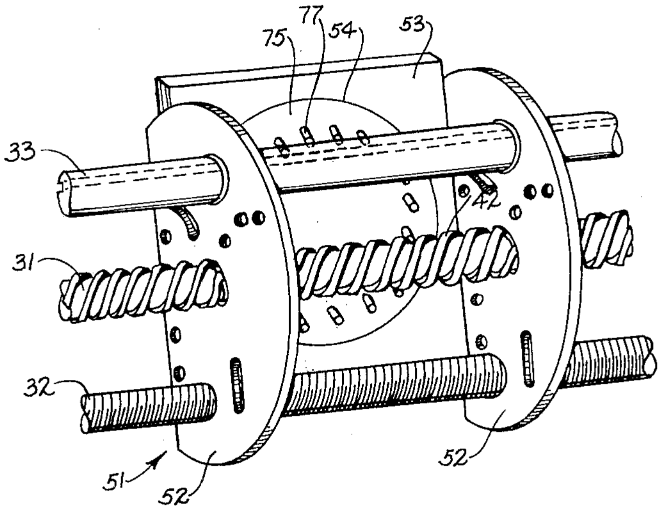
Figure 5 is a back view of the carriage member shown in Figure 2 showing the relationship between this carriage member and the means for rotating the marking member.

Before going, however, to the specific description of the pencil motor plate, it should be pointed out that the pencil motor comprises essentially a carriage carried in the race-way 54 of the pencil motor carrying plate 53, this carriage being so arranged that it will be rotated with respect to the plate 53 as the carriage 51 moves longitudinally along the shafts 32, 31 and 33. This operation is more clearly seen in the back view of Figure 5 from which all parts contained by the carriage 51 behind the pencil motor itself have been removed in order that the operation may be more fully understood.

The pencil motor 75 is essentially a rotatable disc which rotates in the race-way 54 of the pencil motor carrying plate 53. The pencil motor disc 75 has a plurality of pins 77 extending therefrom and so arranged that they engage the helical thread 42 of the shaft 31. As the carriage 51 moves longitudinally with respect to shafts 31, 32 and 33, the engagement of the pins of the pencil motor disc 75 with the stationary helical thread 42 causes the pencil motor disc 75 to rotate. The rotation of the pencil motor disc 75 thus depends on the longitudinal movement of the carriage 51 which is obtained in the manner previously pointed out with respect to Figure 2. The rotation of the pencil motor disc 75 continuously sharpens the point of the pencil as hereinafter pointed out.

Figure 6:
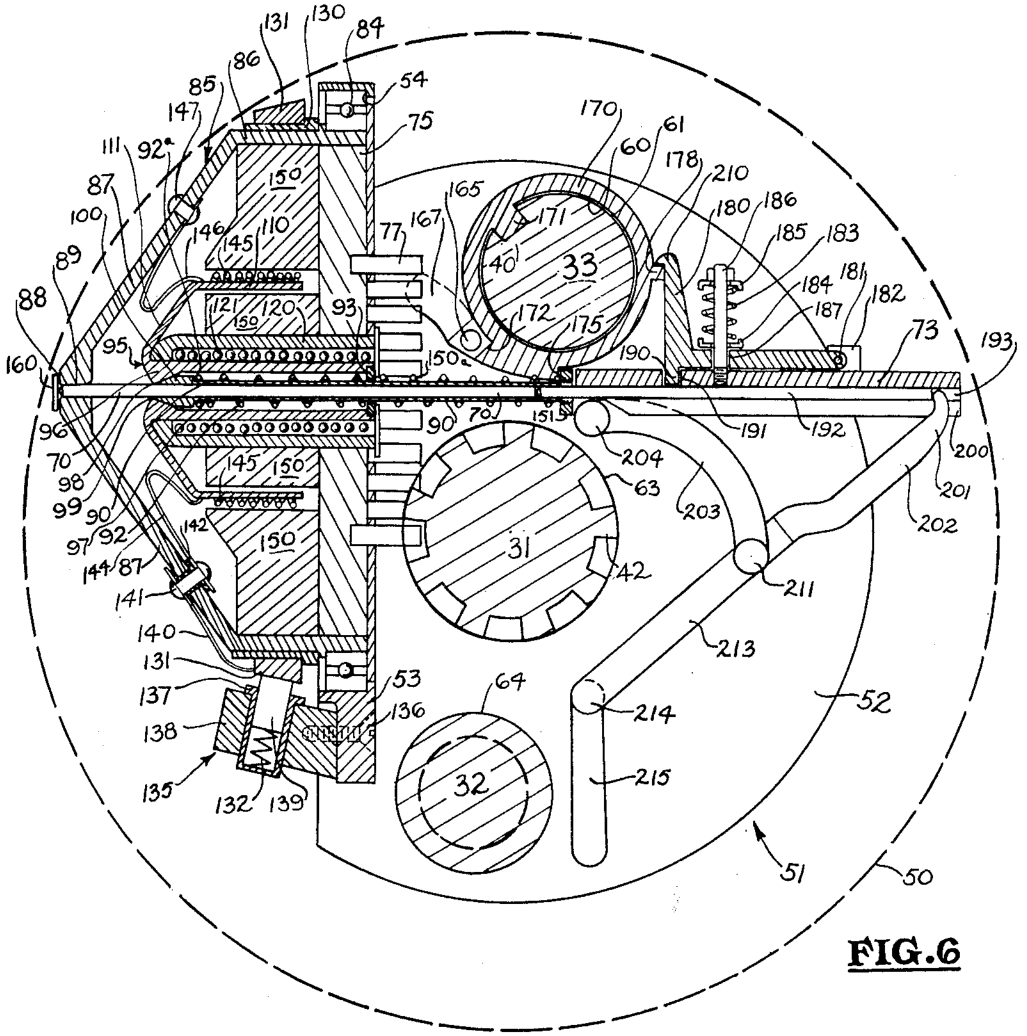
Figure 6 is a cross sectional view through the carriage member of Figures 2 and 5 showing all of the marking elements and the operation thereof.

In Figure 6, I have shown a cross-sectional view through the carriage 51 showing the arrangement of the various parts and the mounting of the pencil within the carriage 51. The hollow drum 50 is indicated in phantom.

The carriage 51, as above pointed out, comprises the opposite parallel plates 52 having the opening 60 for the slotted shaft 33, the opening 63 for shaft 31 having the helical thread 42 and the threaded opening 64 for the threaded shaft 32.

A cross plate or platform 73 (also Figs. 4 and 9) is supported between the plates 52 in any suitable manner as by welding or riveting, as indicated at 80, 80 of Figure 3. Similarly, the front pencil motor-carrying plate 53 is secured in position between the plates 52, 52 in any suitable manner as by welded or riveting as indicated at 81, 81 of Figure 3. The principal supporting disc 75 of the pencil motor is rotatably supported in the race-way 54 of the pencil motor-carrying plate 53. Friction may be reduced in any suitable manner as, for instance, by the use of the ball bearings 84.

The main pencil motor disc 75 carries a substantially circular housing 85 having a cylindrical wall 86 and a preferably integral conical wall 87 connected thereto, the said conical wall 87 terminating at its apex in a slightly flattened section 88 having an opening 89 through which the pencil 70 may project.

The pencil 70 is held in a clamping arrangement comprising a lead vise 90, which (see Figure 7 as well as Figure 6) is essentially a tubular member adapted to contain the length of pencil 70.

The front end of the tubular member 90 is slotted, as at 91, at various spaced points around its periphery so that this end may be compressed slightly to grasp the pencil 70. The forward end of the tubular member 90 is provided with an annular ledge 92*a* normal to the axis of the tubular member 90 against which one end of the compression spring 92 bears. The opposite end of the compression spring 92 bears against the nut 93 of the armature 95.

The armature 95 has a central substantially tubular section 96 having a hollow opening 97 therein terminating in a conical end 98 with an opening 99 at the apex of the cone.

The ledge 92*a* of the tubular member 90 is formed by a conical annular projection 100 around the end of the tube 90. The base of the opening 97 opposite the conical end 98 is closed by the nut 93. The spring pressure generated by the compression of the spring 92 between nut 93 and the annular ledge 92*a* drives the left-hand end of the tube 90 so that the conical end 100 thereof is compressed by the conical interior 98 of the opening 97 of the armature. Consequently, the pencil 70 which projects through the left-hand end of the tube 90 through the opening 99 in the armature and the opening 89 of the housing is clamped into appropriate engagement by reason of the fact that the spring drives the clamping members 100 tightly against the interior of the cone 98 and thus tightly into engagement with the pencil.

In the preferred condition, the desired clamping force on the lead is of the order of 2 lbs. The compression spring 92 may, accordingly, be relatively light since the angle of cone 100 and the interior conical surface 98 may be such that considerable force multiplication is obtained.

Figure 7:
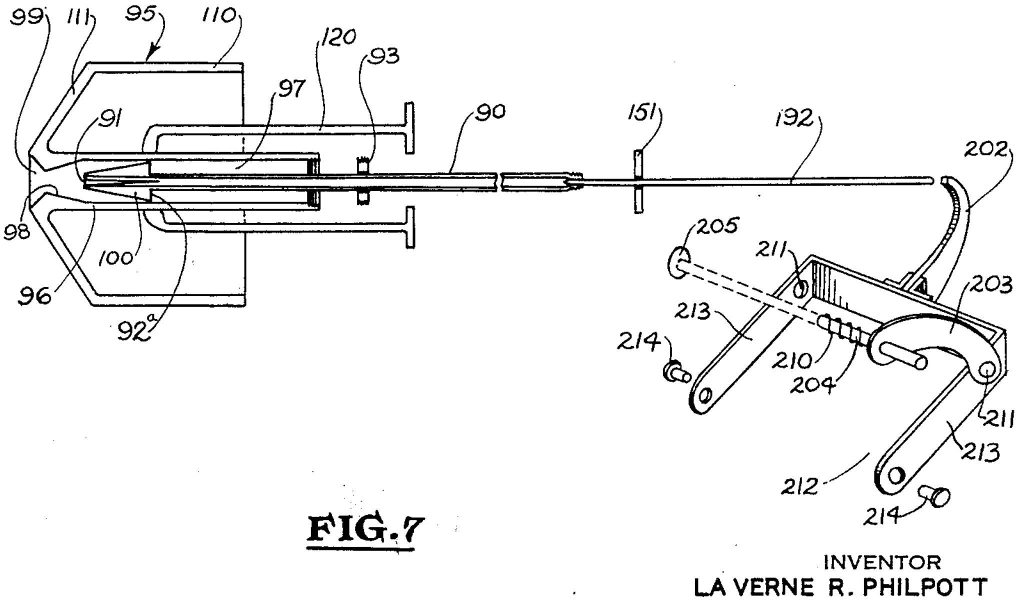
Figure 7 is an expanded view of a portion of Figure 6 showing the pencil holding and adjusting means.

The armature 95, as seen from Figure 6 and the exploded view of Figure 7, is a substantially cylindrical member having the cylindrical wall 110 and the conical wall 111, having the opening 99 at its apex.

The armature 95 is supported in the outer bearing race 120 carried by the motor disc 75. Balls 121 mounted between the armature tube 96 and the outer bearing race 120 provide for relatively frictionless longitudinal motion of the armature but prevent any rotational motion of the armature with respect to the disc 75; that is, the balls 121 are arranged longitudinally in appropriate longitudinal race-ways so as to permit free longitudinal motion but no rotation.

The annular wall 86 of the motor housing is provided with an annular insulating ring 130 around which is mounted the annular conductive slip ring 131.

A brush assembly 135 is mounted in any suitable manner as, for instance by the screw 136, at one end of the pencil motor carrying plate 53. The brush assembly 135 comprises an insulated bushing 137, supported by the bracket 138, in which is mounted the brush 139 urged into conductive relation with the conductive slip ring 131 by the compression spring 132.

An appropriate electrical connection is made in any suitable manner between the shaft 33, which is of conductive material, and the brush 139. Shaft 33 may readily be used for this purpose since it is ordinarily not a rotatable shaft, and, when it does rotate, it rotates through only a relatively small angle and then returns to its original position. In order to permit this type of connection to be made, the opening 60 (Figures 3 and 6) in each of the plates 52 of the carriage 51 is provided with the insulating bushing 61. Current thus flows from the conductive shaft 33 through an appropriate electrical connection to the brush 139 to the slip ring 131; from the slip ring 131 it flows through the conductor 140 to the conductive rivet 141. Rivet 141 is insulated from the pencil motor housing 87 by the insulating bushing 142. From the portion of the rivet 141 on the interior of the housing 87, current flows through the conductor 144 to the coil 145 of the armature 95. Current then flows from the opposite terminal of the coil 145 through the conductor 146 to the rivet 147 to ground.

Accordingly, received picture signals will be impressed on the armature coil 145 and thus cause the armature 95, which carries the coil 145, to vibrate in accordance with the intensity of the picture signals with respect to the permanent magnet 150.

Small spring 150*a* may be provided between the motor pencil plate 53 and the nut 151 to counterbalance the very slight weight of the pencil assembly at the bottom of its stroke when the apparatus operates in a horizontal position. I have found that best results may be obtained when the axis of the recording drum is vertical, thereby obviating the unbalancing effect of gravity.

Figure 8:
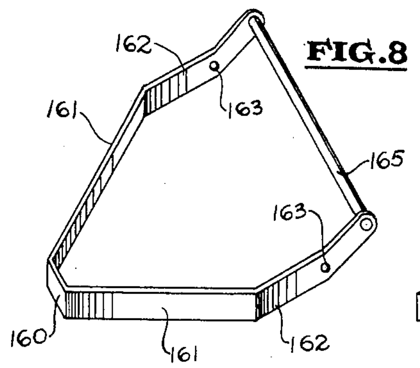
Figure 8 is a view in perspective of the pencil stop member of Figure 6.

In Figure 6, the pencil is shown just prior to the commencement of a scanning operation with the pencil retracted and held in place by the stop 160. The stop member 160 is also shown in Figure 8, where it is seen that it is a portion of a lever operated by the resetting shaft 33. The stop member 160 is provided with a pair of arms 161, 161 which pass on opposite sides of the pencil motor housing 87 and which connect with a pair of arms 162, 162, each extending on the outside surface of the carriage plates 52.

The openings 163, 163 in the arms 162 (Figure 8) are rotatably supported on the pins 164, 164 (Figures 2 and 3) on the outside surfaces of the carriage plates 52 so that the stop member 160 and its associated supporting arms 161 and 162 are rotatable about the pivot pins 164. The connecting rod 165 between the free ends of the arms 162 passes through the arcuate openings 167 (Figures 2 and 3) in the opposite carriage plates 52.

It will be obvious that pushing down the rod 165 will rotate the arms 161, 162 so that the opposite ends carrying the stop member 160 will move up.

An appropriate coil spring around the pivot pin 164 shown in Figure 3 and bearing upwardly on arms 162—161 which carry stop member 160, will bias the stop 160 upwardly to a point where it will block the pencil, as shown in Figure 6, and thus prevent the pencil from emerging from the opening 89 in the pencil motor housing.

A cam 170 is provided between the carriage plates 52 and is supported by the slotted shaft 33. This cam is provided with an inwardly extending tongue 171 which engages the slot 40 in the slotted shaft 33 so that the cam 170 will be rotated by the shaft 33 when the shaft 33 rotates. On completion of the scanning of the picture, the shaft 33 will be rotated in a counterclockwise direction (with respect to Figure 6), thus rotating the cam 170 in a counterclockwise direction.

The cam 170 is provided with an extension or ledge 172 which supports the cross rod 165 of the stop member 160. Rotating the cam 170 counterclockwise will result in counterclockwise movement of the cam extension 172 and will permit the cross rod 165 to move downward toward the right in the arcuate opening 167. This will permit the stop member 160 to move upwardly in front of the opening 89.

Rotation of the cam 170 simultaneously results in rotation of the ledge 175 thereof. Ledge 175 engages the nut 151 on the end of the tube 90 to pull the tube toward the right slightly and thus release the pressure of the conical members 100 on the pencil 70. This also, of course, withdraws the pencil slightly into the opening 89 so that the stop member 160 may move freely across the opening. The pencil now is retracted from the paper lining the interior of the drum 50.

At the same time, and in order to permit the operations above set forth, the extension 178 on the cam 170 is raised by counterclockwise rotation of the cam thus lifting the clamping member 180. The clamping member 180 is rotatably supported on the pivot 181 journalled in lugs 182 on the cross shelf 73. It is biased downwardly into clamping engagement by the compression spring 183, the lower end of which bears against the loose washer 184 on the upper surface of the clamping member 180 and the upper end of which spring bears against the stationary washer 185 held by the bolt 186.

Bolt 186 passes through an opening of substantially larger diameter 187 in the clamping member 180 and is supported in the cross plate 73. Accordingly, the compression spring 183 biases the clamping member 180 in a counterclockwise direction and downwardly with respect to the cross shelf or cross piece 73.

Figure 9:
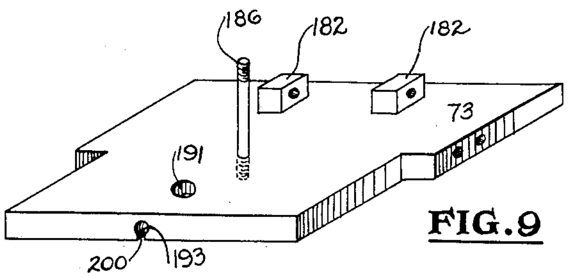
Figure 9 is a view in perspective of the cross plate supporting member of Figures 4 and 6.

The lower end of the clamping member 180 is provided with a clamping portion 190 passing through an opening 191 in the cross shelf and engaging a rod 192 supported in a tubular opening 193 in the cross shelf. The construction of the cross shelf 73 and of the cooperating elements above described is shown in Figure 9.

The tubular opening 193 in the base of the cross shelf 73 is aligned with the tube 90 so that the rod 192 may project from the tubular opening 193 into the tube 90. The lower surface of the tubular opening 193 is slotted at 200 (see Figures 6 and 9) so that the end 201 of the lever 202 may enter into the tubular opening 193 to push the rod 192 to the left.

In ordinary operation, with the cam 170 rotated about 30° clockwise from the position shown in Figure 6, the cross rod 165 is at the upper end of slot 167 and the stop 160 is below the opening 89. The ledge 175 of cam 170 does not engage the nut 151. Accordingly, the compression spring 92 ensures that the conical members 100 will clamp the pencil 70 tightly and the pencil is free to move up to the paper lining the interior of the drum 50. The pencil is prevented from moving back by reason of the fact that the clamping portion 190 of the clamp 180 is held down against the rod 192 by the spring 183, and rod 192 bears against the end of pencil 70.

When the elements are positioned, as shown in Figure 6, the ledge 178 engaging the hook 210 of clamp 180 raises the clamping portion 190 out of engagement with the rod 192. Pressure of the end 201 of lever 202 on the end of rod 192 will now push the rod 192 to the left and consequently push the pencil 70 to the left until it engages the stop 160.

Rotation of the slotted shaft 33 in a clockwise direction will now permit the spring 183 to press the clamping portion 190 of the clamp 180 on the rod 192; and simultaneously the nut 151 will be released by the ledge 175 of the cam to permit the compression spring 92 to tighten the clamping head 100 on the pencil. At the same time, the rod 165 of the stop 160 will be raised, pushing the stop 160 down away from the opening 89 so that the pencil 70 may emerge through the opening 89.

The portions of the cam 170 may more readily be seen in the perspective view of Figure 10.

The lever 202 is mounted for movement toward the left by means of the arm 203 to which it is pivotally connected at 211 and which is rotatably mounted at 204 in an appropriate bearing 205 on the interior of plate 52 (see Figures 3, 6 and 7). The pivotal end 204 of the arm 203 is a shaft carried between the opposite bearings 205 in the opposite plates 52.

A coil spring 210, indicated in Figure 7, imparts a counterclockwise bias to the arm 203.

Each of the opposite arms 203 is pivotally connected at 211, 211 to the bifurcated support 212 for the arm 202, the said bifurcated support comprising the connected arms 213, 213. The free end of each of the arms 213 is provided with a pin 214 which engages in the slot 215 of the side plate 52.

When clamping pressure is removed from the rod 192 by raising the clamp 180, then the coil spring around the shaft 204 tends to rotate the arm 203 in a counterclockwise direction. This will pull the arm 202 and arm 213 toward the left with the end 201 of the arm 202 pushing the rod 192 toward the left to push the pencil 70 toward the left.

In order to compensate for the fact that the end 201 of arm 202 must move linearly, the center of rotation 214 of the arm 202—213 is permitted to move downwardly in the slot 215. Accordingly, the rectilinear mechanism comprising the arm 202—213 and the arm 203 is constantly biased to move the pencil 70 toward the left. This bias is overcome by the clamp 180 while the device is in operation, but when the clamp 180 is raised and the pencil tube 90 is retracted to loosen the clamping end 100, the rectilinear mechanism terminating in the element 201 is free to move the rod 192 and the pencil 70 up to the stop 160. Thereafter, when the clamp 180 is re-engaged and the stop 160 is removed, the spring 92 re-sets the clamping end 100 to hold the pencil rigidly with respect to the armature 95 and to cause the pencil 70 to protrude slightly from the opening 89.

The vibration of the armature 95 will now result in variations of the density of the marking of the pencil on the papers which lines the interior of the drum 50.

Operation of the device as thus far described is as follows: When the motor 10 drives the gear 16 to rotate the gears 25 and 25′ and thus to result in rotation of the large gears 30 and 30′, these gears will rotate the shafts 40 and 32 in a planetary manner around the stationary shaft 31. Accordingly, the entire carriage 51 comprising the carriage plates 52, the motor pencil supporting plate 53 and the shelf 73 will rotate in the same way as do the gears 30 and 30′.

At the same time, the threaded shaft 32 will rotate by reason of the engagement of its gear 35 with the gear 36 on bushing 260. Rotation of shaft 32 causes the carriage 51 to move longitudinally.

Vibrations of the armature in accordance with picture signals that are received and impressed on the coil 145 will cause the pencil to vibrate to vary the density of the markings made by the pencil on the paper which lines the interior of the drum 50.

The drum 50 is, of course, stationary at all times. Accordingly, as the entire carriage rotates inside the drum and simultaneously moves longitudinally with respect to the drum, the pencil will trace a helical line around the paper on the interior of the drum 50.

The pitch of the helical trace will be determined by the pitch of the thread of the threaded shaft 32 and the relative speed of rotation about its own axis of the shaft 32 with respect to the speed of rotation of the entire carriage.

On completion of the scanning operation, that is, on completion of the movement of the carriage 51 from one side to the other of the drum, the shaft 33, as hereinafter described will be rotated counterclockwise about 30° (with respect to Figure 6) to retract the pencil and loosen the clamp thereon and bring the stop 160 up in front of the pencil. The lever end 201 will automatically re-set the pencil, and the rotation of the slotted shaft 33 back to its original position will re-set the clamp for the pencil and remove the stop 160 to prepare the pencil 70 for another scanning operation for another picture.

While scanning is proceeding, the pencil and, in fact, the entire mount for the pencil is rotated (in order to maintain a sharp point on the pencil) by means of the pins 77 extending from the main plate 75 of the pencil mount and in engagement with the helical threads 42 on the stationary shaft 31.

Thus far, the description has embraced the operation of the carriage to trace the helical scanning line from one end of the interior of the drum to the other, the rotation of the pencil mount to maintain a sharp point on the pencil while scanning is proceeding, and the re-setting of the pencil to appropriate pressure position (to compensate for any wear thereon) at the end of the scanning of a picture frame.

My device includes, in addition, specific novel means for automatically returning the carriage to the original scanning position; novel means for feeding the paper into and out of the interior of the drum; novel means for cutting the paper at the end of each picture frame; and novel means for maintaining synchronism.

The principle of operation of this system is that a mark made by a pencil on a piece of paper depends upon the applied pressure and follows the empirical formula, $$FORCE=KE^n$$

where $n$ is the shade coefficient, E is the natural logarithm base, and K is a constant.

Figure 11:
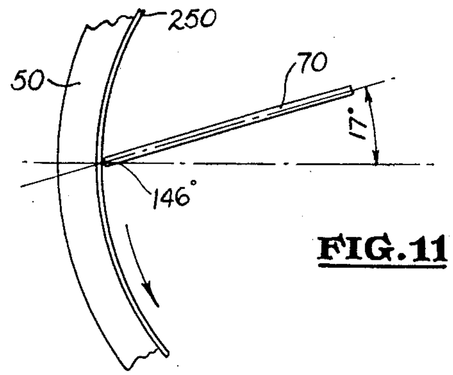
Figures 11 and 12 are enlarged fragmentary schematic views showing the relationship between the marking pencil and the recording paper.
Figure 12:
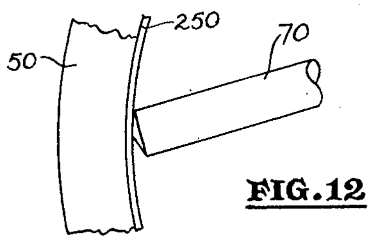

In Figures 11 and 12, I have shown the optimum arrangement of the pencil where the pencil is so arranged that its point which is sharpened to an angle of 146° is inclined 17° from the normal. The point of 146° is maintained by constant rotation of the pencil about its own axis, that is, the pencil tube 90 and the pencil are at the exact center of rotation of the pins 77. The angle of 17° between the axis of the pencil and a line normal to the paper is necessary to prevent side force on the point. The exact angle depends on paper friction on the pencil and is independent of the marking force.

The armature 95 is so arranged that it tends to advance outwardly slightly from the magnet 150, thus bringing the pencil end into contact with the paper 250 (Figures 11 and 12). As the lead wears slightly, the armature 95 advances the pencil out accordingly to maintain slight contact with the paper. The vibration of the armature toward the paper, however, by reason of variations in energization of the armature coil 145, results in the marking.

The armature is so arranged that it may compensate for approximately $\frac{3}{16}$″ in wear in the lead, that is, even though the lead is worn down $\frac{3}{16}$″ from its condition at the start of a picture, vibration of the armature will nevertheless produce variations in shading from black to white on the paper 250. I have found, however, by experiment, that a little more than ⅛″ lead is used in sending 40 square inches of solid black print. In general, less than $\frac{1}{16}$″ will be used on a single picture frame. Thus, it is unnecessary to correct for point wear, except between frames. This is done during the rewind process, at which time the pencil tube 90 is retracted with the pencil, the clamp 180 is released and the stop 160 moves up in front of the pencil.

The operation of the rectilinear mechanism 203—202 previously described resets the pencil; and on completion of the rewind operation, the pencil is clamped once more in its original position and the stop 160 is removed. It will be noted that the clamp 180 which holds the pencil in its original position is not directly connected to the pencil but rather presses down on the rod 192 which bears against the rear end of the pencil 70. Thus, the rod 192 pushes the pencil 70 up against the stop 160. The re-setting clamp 180 clamps the rod 192 to prevent the pencil from moving back. The pencil 70 is itself clamped into the armature by the clamping elements 100. Removal of the stop 160 now permits the armature to move the pencil out slightly and thus to move it away slightly from the left hand end of rod 192 (Figure 2). The pencil 70 is now entirely under the control of the armature 95 alone and is brought up very lightly into engagement with the paper 250 in preparation for recording in response to energization of coil 145.

The apparatus provided for rewinding and re-setting the mechanism is shown in Figures 1, 13, 14 and 15.

The gear 36 is fastened to a bushing 260 which is integral with the gear 261 (Figures 1 and 14). Gear 261 meshes with gear 262 carried on the shaft 26 and which is driven through the clutch mechanism 263 shown in Figures 15 and 16. When the clutch is closed, gears 25 and 262 are driven together.

The gear ratios are so arranged that gear 261 is then driven at $^{11}/_{10}$th the speed of gears 30, 30'. In other words, when operated, the gear 261 is driven 10% faster than the gears 30, 30' which rotate the carriage 51.

Gears 35 and 36 are the same size so that shaft 32 is rotated once in its bearings as it revolves ten times about the shaft 31 which always remains stationary.

Since the threads on shaft 32 are 10 per inch, the gears 30 will rotate one hundred times while the pencil marking device advances one inch.

When the frame is printed, or at the discretion of the transmitter operator, a contact is closed to disengage the clutch 263 between gears 25' and 262, and simultaneously a brake is applied to stop the gear 262. Thus, with the gear 262 stopped, gears 261 and 36 must also stop. Gear 35 will therefore roll around the gear 36 rotating at high speed in the opposite direction and bringing the printer motor assembly back to its initial position. When this point is reached, the clutch 263 is operated to release the brake from gear 262. Gear 262 is now free to rotate but is not driven.

Since the gear 262 is free, it will permit the gear 261 to rotate. Gear 261 is now rotated because the gear 36 carried thereby is in engagement with the gear 35 of the threaded shaft 32; since the gears 36 and 262 are free to rotate together in a system which is not connected to other elements, the engagement of gear 35 of threaded shaft 32 with gear 36 will cause gear 36 to rotate simultaneously with the gear 30', thus rotating gears 261 and 262. Accordingly, the marking device will idle until the starting signal is received.

When the starting signal is received, gears 25' and 262 are integrated by the clutch 263 so that they are driven together. The gear 262 will now drive gear 261, and hence the gear 36, at the relative speed previously noted, that is, the gear 36 will be driven at $^{11}/_{10}$th the speed of gear 35 resulting in one hundred rotations of the carriage for each linear inch of movement thereof and thus spacing adjacent scanning lines by 100th of an inch.

In Figures 15, 16 and 17, I have shown the elements of the clutch 263. The shaft 26 has a threaded end 270 which extends through a counterbored stud 271 on the gear 262 and is captured by the nut 273 held against the right end of the stud 271. The gear 262 is appropriately positioned by the compression spring 275 between the interior surface 276 thereof and the interior surface of the nut 273. A thrust bearing 276a between the nut 273 and the spring 275 permits the gear 262 to rotate freely.

The gear 25' is provided with a clutch face 280 which passes through the center of the thrust bearing 281 to engage the clutch face 282 of the gear 262. The thrust bearing 281 ensures a substantially frictionless condition between the clutch shifting disc 292 and gear 262 when no drive is desired. Ordinarily, the spring 275 drives the clutch faces 280 and 282 together.

When the coil of magnet 290 (Figure 16) is energized, it attracts the armature 291. The armature engages the clutch shifting disc 292 and moves the same toward the right with respect to Figures 15 and 16. Movement of the clutch shifting disc 292 to the right pushes the thrust bearing 281 and the gear 262 slightly to the right. This disengages the gear 262 from driving engagement with the gear 25'.

Further energization of magnet 290 will attract the armature an additional step toward the right and push the gear 262 up against the brake disc 295 and push this disc against the bearing 296. This will stop the gear 262.

Partial deenergization of coil 290 will permit the spring 275 to push the gear 262 away from the brake disc 295 to permit the gear to rotate freely.

Full deenergization of the magnet coil 290 will permit the clutch faces 280 and 282 to re-engage once more so that gear 262 will rotate with gear 25'.

In Figure 17, I have shown a slightly modified construction where, in addition to the magnet 290 and armature 291 and other elements shown in Figures 15 and 16, a further braking mechanism is provided instead of a brake disc 295. In this case, a separate magnet coil 300 is provided to attract the armatures 301, 301 to engage the stud 271 of the gear 262.

Where the device of Figure 17 is used, the coil of magnet 290 of Figure 16 is energized to disengage gears 25' and 262, and then the coil of magnet 300 is energized to brake the gear 262. This is somewhat better than the possibly marginal operation where a single coil on a single magnet 290 of Figure 16 is used and is energized partially to disengage the gears and further energized to brake one of the gears. The preferred form is the combination of the clutch disengaging mechanism of Figure 16 as applied to Figure 15 and the braking mechanism of Figure 17 as applied to the stud 271 of the gear 262 of Figure 15.

Gear 261 is provided with a spiral groove 310 (see especially Figure 14). This groove is engaged by the crank arm 311 (Figures 13 and 18) which is keyed to the slotted shaft 33.

Crank arm 311 is provided with a transverse pin 312 which engages in the groove 310. The crank arm 311 is spring loaded by means of tension spring 313 to an intermediate position, the said tension spring 313 engaging the pin 312 of the crank arm at one end and, at the other end, engaging the pin 314 on the gear 30'.

The spiral groove 310 of the gear 261 comprises an outer circular groove 320, an inner concentric circular groove 321 and a spiral connecting groove 322 curving centripetally in a clockwise direction from the outer circular groove 320 to the inner circular groove 321 and forming a connecting passage therebetween.

Any movement of the crank arm 311 will be translated into angular movement of the slotted shaft 40 and will accordingly be translated into rotation of the cam 170 of Figure 6 for pencil adjustment purposes, as described previously in connection with Figure 6.

During the printing cycle, the pin 312 of the crank 318 is driven toward the center of the gear 261 until the pin 312 rides in the circular groove 321 of the gear 261. Accordingly, during the printing operation, the gear 261 rotates in the direction shown by the arrow 325 in Figure 14.

At the conclusion of a printing operation and on actuation of the clutch elements 263, as previously described in Figures 15, 16 and 17, the relative motion of gears 30' and 261 is reversed. Consequently, the direction of rotation of gear 261 with respect to gear 30' is in the direction shown by the arrow 326 of Figure 14. The pin 312 of crank arm 311 will now, on this relatively reverse motion, ride out of the circular groove 321 into the spiral groove 322 and out into the outer circular groove 320. This will result in a rotation of the crank arm 311 through an angle of about 30° and in a corresponding rotation of the slotted shaft 40 and, therefore, in a corresponding operation of the cam 170 for the pencil re-setting operation.

The intermediate spring loading of the crank arm 311 by the tension spring 313 will ensure that the pin 312 of crank arm 311 bears against the inner surface of groove 320 and against the outer surface of groove 321 so that on rotation of the gear 261 with respect to the pin 312 in an appropriate direction, the pin 312 will enter into the spiral 322.

In Figures 19 and 20, I have shown in somewhat schematic cross-sectional view the paper feed for the recording apparatus of Figures 1 and 6. The paper 250 is drawn from a suitable supply roll by the driven feed roll 350. Suitable pressure for drawing and feeding the paper is provided by the spring loaded pressure roll 351. Pressure roll 351 is mounted on bracket 352 pivotally mounted at 353 and having the handle 354, by means of which the bracket 352 may be rotated about pivot 353 to remove the roll 351 from engagement with roll 350.

Preferably, bracket 352 is spring loaded by an over-center spring, so that in the position shown in Figure 19, the roll 351 is brought to bear against the roll 350; while, when the bracket is rotated 90° counterclockwise by handle 354, it will remain in that position until snapped to the pressure position.

An upper guide plate 360 is provided (see also Figure 21) having the recess 361 for the pressure roll 351 and having the guide recess 362 for passage of the paper around feed roll 350 prior to the entry of paper into the interior of drum 50. When the paper emerges from the drum 50 on the other side, it is appropriately guided by the further recess 363 cooperating with the guide plate 360.

Clamping plate 365 is mounted beneath the guide plate 360 (see Figures 19 and 21). The clamping plate 365 has a lower surface 366 which matches and completes the inner circular surface of the drum 50. Clamping plate 365 also has a curved surface 367 on its left side which matches the lower portion of roll 350 and which is continuous in the clamped position with surface 362 of guide plate 360. Clamping plate 365 also has a right hand curved surface 368 which is continuous with the guide surface 363 of the guide plate.

Surfaces 370 of guide plate 360 and 371 of clamping plate 365 match each other but, in operation, with paper being fed through the drum, are not in contact with each other.

The surfaces 367 and 368 of clamping plate 365 when the clamping plate is in clamping engagement prevent any motion of the paper 250 with respect to the drum 50, and thus resist any slight torque which may arise from the movement of the pencil with respect to the paper.

Clamping plate 365 is biased upwardly into clamping engagement with the paper by means of the spring loaded pins 380, 380 (Figures 19 and 21). Each of the pins 380 passes through a counterbored opening 381 in the guide plate 360 normal to the surface 370 of the said guide plate; the lower end of each pin 380 is threaded at 382 so that it may engage in the tapped opening 383 of the clamping plate 365.

Openings 381 in the guide plate 360 are each counterbored at 386 to receive the stop bushing 387 on each of the pins 380 which limit downward movement of the pins 380 and consequently downward movement of the clamping plate 365.

The upper end of each of the pins 380 is threaded at 389 to receive the nut 390.

A clamp operating cross-shaft 391 is provided rotatably mounted in suitable bearings and carrying the crank arms 392 (see also Figures 20 and 22). Crank arms 392 are keyed to the shaft 391 in any suitable manner and are each provided with openings 393 through which the pins 380 with nuts 390 pass. The crank arm 392 extends above the bushing 387.

A compression spring 394 is provided around the upper end of each pin 380 between the upper surface of the crank arm 392 and the undersurface of nut 390. Since the crank arm 392 is ordinarily stationary, the compression spring 394 normally biases the pin 380 upwardly by bearing against the nut 390 thereon and accordingly biases the clamp 365 upwardly into clamping engagement. The force exerted by the compression spring 394 may be varied by the adjustment of nuts 390.

An appropriate housing 400 may be provided over the pins 380, the clamp operating shaft 391 and the cranks 392.

For ordinary operation, after a picture has been recorded, the paper will be fed forward for an additional recording frame; and to make possible this feeding of the paper, the shaft 391 will be rotated clockwise, with respect to Figure 19, to depress the bushing 387 and hence the pins 380, and thus to depress the clamp 365 to release the paper from clamped engagement.

In ordinary operation, the rotation of the clamp operating shaft 391 is automatic to release the paper 250 (and the supply roll 250*a* and the delivered marked sheet 250′) only at the end of a complete picture scanning operation and to cause the picture to be fed forward for one frame only. It may be necessary, however, in appropriate cases, to thread the paper through the machine or to feed the paper forward irrespective of any picture record that may be placed thereon. Accordingly, the shaft 391 is provided with an additional manually operated crank 402 (Figures 19, 20 and 23) which is keyed to the shaft 391 and the end of which extends out slightly from the housing 400. Crank 402 may thus be manually depressed to rotate the shaft 391 and release the clamp 365.

An additional guide element 404 may be provided (Figure 19) on the drum 50 adjacent the feed roll 350 to ensure appropriate engagement of the paper 250 between rolls 350 and 351.

The apparatus may also be provided with a picture viewing bed plate 410 onto which the scanned paper 250′ may be fed. This plate 410 may be curved at 411 to cooperate with curved surface 363 of guide plate 360 and curved surface 368 of the clamping plate 365 to form a passage for the paper out of the drum.

The sides of the bed plate 410 are provided with flanges 410*a* at the edges overlying the surface of the bed plate and spaced from the surface by slightly more than the thickness of the paper 250, the inner edges of the flanges being spaced from each other by less than the width of the paper 250. The flanges 410*a* accordingly hold the paper firmly on the bed plate 410 even in that form of construction in which the bed plate 410 is vertical while, nevertheless, permitting the paper to move freely with respect to the plate 410.

The feed roll 350, in addition to being operated by the motor at appropriate intervals to feed successive lengths of paper into the drum, may be manually operated by a handle 413 to feed the paper forward.

The machine as a whole may be operated by the handles 414, 414 connected to the principal gears 30, 30′ to adjust the apparatus.

In order to thread the paper through the machine, handle 354 is rotated counterclockwise to release the pressure roll 351 from the feed roll 350. The paper 250 is then passed up over the guide 404 around the feed roll 350, being guided by the guide surface 362. The crank 402 is depressed, releasing the clamp 365, and the paper is further pushed past the clamp 365 along the guide surface 366 into the interior of the drum 50. Continuous pushing of the paper or slow operation of the feed roll 350 with the pressure roll 351 engaged therewith will now feed the paper around the interior of the drum until the edge of the paper emerges on the opposite side. The paper will then move past the curved surface 368 of the clamp and the curved surface 363 of the guide plate 360 and around the curved surface 411 of the viewing plate 410 to emerge upon the viewing plate.

The only feed roll required is the feed roll 350.

The slight back pressure on the paper, owing to friction of the paper against the inside of drum 50 and the surface of viewing plate 410, will cause the paper to curve around to hug the interior of the drum 50. In order to increase this back pressure, a spring biased plate (not shown) may be mounted at the left hand end of the bed plate 410 (with respect to Figure 19) immediately following the curve 411 to create back pressure on the paper. On release of the crank 402, the clamping plate 365 engages the paper tightly and prevents any movement thereof.

On completion of a scanning operation, the clamp 365 is disengaged and the rotation of feed roll 350 causes the paper to move once more. The scanned sheet may be rolled up on a take-up roll or it may be cut off as each picture is completed.

Where a take-up roll is used, its speed is so adjusted that it does not give the paper any greater linear speed than that imparted to the paper by the feed roll 350, and, in fact, the take-up roll should give the paper a slightly lesser linear speed so that there will be sufficient slack on the paper to create sufficient friction to cause the paper to hug the interior of the drum 50. The paper should, of course, be sufficiently strong and stiff so that it will not crumple when fed around the interior of the drum by the feed roll 350. The paper should, nevertheless, be sufficiently flexible so that it will properly hug the interior surface of drum 50. I have found that an optimum paper for this purpose is a white bond paper .003″ to .004″ thick.

Instead of a take-up roll, a preferred form is to utilize means for cutting off the sheet automatically at each picture frame. Thus, as indicated at Figure 19, a completed picture is fed out on the paper 250′ on the viewing plate 410. The picture may be examined, and, if necessary, torn off against straight edge 420 of the guide plate 360. However, if the paper is not thus torn off, then at the conclusion of the next scanning operation, the scanned picture 250′ is fed forward beneath the cutting knife 421 which cooperates with the edge 422 of the viewing plate 410 and is mounted on the crank 423, which crank is mounted on the shaft 424.

Shaft 424 may be adjusted for rotation in a counterclockwise direction over an angle of about 60° whenever the clamp 365 is released. In other words, shafts 424 and 391 may be connected by a link in any suitable manner for simultaneous operation. Thus, when the clamp 365 is released for feeding the sheet forward, knife 421 may be depressed beneath the surface of plate 410. On completion of the feeding operation, when a new picture frame is moved onto the viewing plate 410, the raising of the clamping plate 365 will be accompanied by simultaneous raising of the knife 421. In this case, the knife may have its cutting edge at its upper end 425 and cooperate with a cross bar 426 having an appropriate cutting edge and arranged above the viewing plate 410 as shown in Figure 19.

Where the upper cross bar 426 is not used, the picture which moves off the viewing plate 410 will not be cut immediately after being moved off but rather at the completion of the next succeeding scanning cycle; while with the use of the upper cross bar 426, the picture on the viewing plate 410 will be cut off immediately after it is fed forward without waiting for the next succeeding scanning cycle.

The essential elements of the control mechanism for the various devices herein described are shown in the upper portion of Figure 1.

Worm 21 on shaft 15 engages with the worm gear 500 on shaft 501. Shaft 501 rotates at the same speed as gears 30 and 30′ and thus rotates at the same speed as the pencil inside the drum.

Two cams 502 and 503 are provided to operate the switches 504 and 505 respectively. Switch 504 is connected in series with the coil 145 of the pencil operating apparatus of Figure 6. When switch 504 is open, there is no current to the pencil mechanism. Cam 502 is arranged so that it will open the switch 504 for about 1/9th of a revolution while the pencil traverses the surface 366 of the clamps 365; thus, the pencil will make no mark on the interior surface of the clamps 365. The purpose of this is to prevent continuous markings on the inner surface of the clamping bar which additively will have the effect of producing a thick coat of graphite which may later be shaken down onto one of the scanned pictures. By this means also, the pencil is not advanced into contact with the surface of the drum or with the paper on the drum at the juncture between the paper and the clamp on either side. This also prevents any possible breakage or scaling of the pencil point.

When the extended surface of cam 502 moves out of engagement with switch 504, then the circuit to the coil 145 of the pencil mechanism is closed so that markings may be made on the paper. The other cam 503 on shaft 501 opens a switch 505 in series with the synchronizing circuit. The opening of this switch 504 thus disconnects the synchronizing circuit at the instant that the pencil passes the center of plate 365 (Figure 19) and maintains contact 505 open for about 180° rotation. The specific operation of switch 505 will be explained in connection with the explanation of the synchronizing elements hereinafter set forth.

Worm 521 also meshes with the worm gear 510 which is freely rotatable about the shaft 512. The gear 510 may, however, be connected by the clutch 514 to rotate the shaft 512 and hence to rotate the cam 515 mounted on the shaft 512. The operation of clutch 514 is disclosed in Figure 24.

When advance of the paper is desired, a signal is received on the picture channel, which, through an appropriate filter 524, energies the coil of relay 525 to close the contacts 523 thus energizing the coil of relay 526 to close the contacts 527.

Coil 526 is locked closed on rotation of shaft 530; the inertia of the rotation of this shaft closes the contacts 531 to lock the coil 526 closed. When relay 526 is closed, the attraction of armature 532 engages clutch 514 so that the gear 510 rotates the shaft 512 and thus rotates the cam 515.

On completion of the signal which energized relay 525 through filter 524, the relay 525 opens, opening the contacts 523. After shaft 512 makes one revolution, cam 515 raises the follower 550, which opens contacts 531, and thus opens the circuit to the relay 526 from the independent power supply 552, thus releasing the clutch 514 and stopping the rotation of shaft 512.

During rotation of shaft 512, the pull rod 600 on shaft 530 which is actuated by the engagement of cam 515 with the follower 550 on shaft 530 releases the paper clamp plate 365 and rotates the feed roll 350 about five revolutions, which is sufficient to advance the paper into the next frame position.

Synchronism is maintained by means of an electrically controlled slipping clutch 12. This clutch is in the form of a common lifting magnet with a center post 601 short so as not to contact the armature 602. The magnet 601 is keyed to shaft 11, while the armature 602 is keyed to the shaft 15. Synchronizing signals are impressed on the magnet 601 by brushes 610 and 611 contacting the slip rings 612 and 613 respectively.

On completion of a picture scanning operation, the circuit to the magnet 601 is opened and the succeeding mechanism does not operate. On receipt of the synchronizing signal, magnet 601 is energized to attract armature 602 to operate shaft 15 and all of the succeeding mechanism.

The light chopping disc 20 on the driven shaft 15 is so arranged that a light source 620 through the iris 621 will pass in an interrupted fashion through an opening 622 to the photo-cell 623 as the chopping disc 20 rotates. The rotation of light chopping disc 20 generates a frequency which is used for synchronizing purposes.

This physical arrangement may be replaced by an inductive phonic wheel generating the tone directly.

In Figure 25, I have shown the other part of the system. Oscillator 700 generates a frequency, about 1000 cycles, which is the same as that generated by the light chopper disc 20 of Figure 1. The output 701 is placed in series with amplified output of the photo-cell 623 of Figure 1 and the same rectified and placed in the coil of clutch 12 of Figure 1. The output voltage of these two sources is equal, so that when they are opposed no current flows in the clutch so that no dragging results, and when they are additive, maximum driving force results. The angular lag between the two sources which will produce 180 electrical degrees change is designed to be less than .01'', or the limit of picture resolution.

Tube 703 is a reactance tube which alters the frequency of oscillator 700 according to its control grid voltage. The synchronizing dash, transmitted during the picture margin, will pass from the filters and limiters from the receiver through contacts 505, Figure 1, diode rectifier 710 thus tending to charge condenser 711. About the center of the synchronizing dash, contacts 505 open, interrupting the signal, letting condenser 711 slowly discharge. There is, therefore, an average potential on condenser 711 which depends on the phasing of cam 503 and the synchronizing dash.

If the recorder is too far advanced, the contacts 505 will open prematurely, thus reducing the potential on condenser 711 which lowers the frequency of oscillator 700, thus bringing the printer back in phase. As it returns the potential on condenser 711 gradually rises and absolute synchronism results. When the machine is started up, the synchronizing dash may come in at any phase; but the frequency of oscillator 700 will be corrected by rotating the phase to bring it in by the shortest route, not forcing it to lag for a complete revolution even if it is only slightly out on the slow side. The regulator tube 720 makes the system sensibly free from power line transients.

Due to the highly variable nature of the torque necessary to drive a variable pressure printer, some type of high speed response drive is necessary, such as set forth above to prevent serious phase lag if low frequency power were the only driving source.

Non-synchronous power lines may be used to supply the primary motive power, or even direct current. The inertia of the clutch magnet is a good source of reserve torque instantly available for use if necessary.

In Figure 26 I have graphically shown the relationship of the recording cycle to the synchronizing signal as above described.

In Figure 27, I have shown a slightly modified construction wherein the basic concept of the structure of Figures 1 to 26 is maintained but wherein the paper feed varies somewhat. In this figure, the arrangement and operation of the pencil structure is shown schematically. The pencil 70 in the housing 87 rotates in the drum and is operated for marking the paper by the armature 95 coacting with magnet 150. All other elements within the drum are the same. The movement of the paper 250 into the drum is however obtained by a pair of feed rolls 801, 802 and draw rolls 803, 804 are provided synchronized with the feed rolls 801, 802 to assist in movement of the paper. Rolls 801—802 and 803—804 may be separated in any suitable manner to thread the paper through the machine. The paper is pushed into the machine so that it hugs the interior of the drum 50; thereafter, operation of the rolls 801—802 and 803—804 at the same speed ensures that the paper will remain in perfect contact with the interior of the drum.

Since the paper is locked at each end by rolls 801—802 and 803—804, plates 860 and 865 may merely be guide plates. However, plate 865 may be used as a clamping plate as in Figure 19. The scanned sheet is fed out onto the viewing plate 810 where it is cut off by knife 811, the equivalent of knife 421 as previously described in connection with Figure 19. The cut sheet 250'' falls into the container 815 whence it may be removed.

In Figures 28 and 29, I have shown a complete apparatus including the elements of Figure 27 but showing a take-up roll 850. The apparatus is provided with a base 820 which may be supported in any suitable manner. Motor 10 mounted beneath the base drives shaft 15 which drives the elements in control box 14. The paper 250 is drawn from a supply roll 830 and is driven by feed rolls 801—802 and draw rolls 803—804 through the drum 50 within which is mounted the pencil unit of Figure 6; the operation of the apparatus is the same as that described in connection with Figures 1 to 26. The scanned paper 250' is taken up on the take-up roll 850 which is driven through gear box 851 from shaft 852 connected to shaft 15 through the control box 14. All other elements in the control box correspond to the elements shown in Figure 1.

In the foregoing, I have described my invention in connection with a horizontal recording drum. It may be preferable to arrange the drum with its axis vertical so that the pencil would not tend to make a heavier mark on each downward stroke. My entire apparatus is so designed, however, that it may function accurately in any position, vertical, horizontal, or with the clamping plate at the bottom (180° removed from the position shown in Figure 19). The elements of my device are so designed that it will function accurately in any moving vehicle including military vehicles, such as tanks, which are subject to severe shocks; in airplanes in which it will record accurately in any position which the airplane may assume during evasive action, loops and other manœuvres; and in ships and boats which are subject to severe rocking motion.

I have here set forth my invention in connection with preferred embodiments thereof. Many modifications should now be clear to those skilled in the art. Thus, the pencil carriage here shown may be adapted to carry a stylus member with the stylus and drum at opposite potential; or it may carry a photosensitive recorder. The feed arrangement for the paper into and out of the drum makes possible continuous facsimile reception with all the advantages of helical scanning. Since these variations and many other modifications are all within the scope of my invention, I prefer to be bound, not by the specific disclosures herein set forth, but only by the appended claims.

I claim:

1. In a facsimile scanning unit; a pencil; means for supporting said pencil comprising a carriage, a magnet mounted on said carriage, and an armature movably mounted with respect to said magnet; a clamp carried by said armature; said clamp holding said pencil in position with respect to said armature; a cam carried by said carriage; a connection between said cam and said clamp; means for operating said cam to release said clamp; and additional means for moving said pencil with respect to said clamp when said clamp is released.

2. In a facsimile scanning unit; a pencil; means for supporting said pencil comprising a carriage, a magnet mounted on said carriage, and an armature movably mounted with respect to said magnet; a clamp carried by said armature; said clamp holding said pencil in position with respect to said armature; a cam carried by said carriage; a connection between said cam and said clamp; means for operating said cam to release said clamp; and additional means for moving said pencil with respect to said clamp when said clamp is released; said cam also controlling said additional means.

3. In a facsimile scanning unit; a pencil; means for supporting said pencil comprising a carriage, a magnet mounted on said carriage, and an armature movably mounted with respect to said magnet; a clamp carried by said armature; said clamp holding said pencil in position with respect to said armature; a member biased to move said pencil with respect to said clamp; a second clamp holding said member against said bias; a cam carried by said carriage; a connection between said cam and each of said clamps; and means for operating said cam to release said clamps to move said pencil with respect to said first clamp.

LA VERNE R. PHILPOTT.

REFERENCES CITED

The following references are of record in the file of this patent:

UNITED STATES PATENTS

| Number | Name | Date |
| --- | --- | --- |
| 456,668 | Boyer | July 28, 1891 |
| 631,536 | Friez | Aug. 27, 1901 |
| 1,438,829 | Howell | Dec. 12, 1922 |
| 1,635,324 | Jenkins | July 12, 1927 |
| 1,746,407 | Schroter et al. | Feb. 11, 1930 |
| 1,985,057 | Philpott | Dec. 18, 1934 |
| 2,109,109 | Finch | Feb. 22, 1938 |
| 2,181,867 | Cameron | Dec. 5, 1939 |
| 2,191,867 | Shore | Feb. 27, 1940 |
| 2,262,032 | Moore | Nov. 11, 1941 |
| 2,282,929 | Billstein | May 12, 1942 |
| 2,292,119 | Hackenberg et al. | Aug. 4, 1942 |
| 2,376,888 | Wise | May 29, 1945 |